US 6,733,371 B2

(12) United States Patent
Giebmanns

(10) Patent No.: US 6,733,371 B2
(45) Date of Patent: May 11, 2004

(54) MACHINE TOOL WITH A SEPARATION WALL BETWEEN A HOUSING AND A WORK SPACE

(76) Inventor: Karl-Heinz Giebmanns, 10 Cedardale Ct., Palm Coast, FL (US) 32137

( * ) Notice: Subject to any disclaimer, the term of this patent is extended or adjusted under 35 U.S.C. 154(b) by 64 days.

(21) Appl. No.: 10/045,808

(22) Filed: Jan. 10, 2002

(65) Prior Publication Data
US 2002/0090898 A1 Jul. 11, 2002

(30) Foreign Application Priority Data
Jan. 10, 2001 (DE) .......................... 101 00 709

(51) Int. Cl.⁷ .............. B24B 7/00; B24B 55/04
(52) U.S. Cl. ............... 451/65; 451/394; 451/455
(58) Field of Search ................ 451/65, 364, 377, 451/379, 392, 393, 394, 457, 334, 451, 455

(56) References Cited
U.S. PATENT DOCUMENTS
5,184,431 A * 2/1993 Combrowski et al. ...... 451/375
5,738,564 A * 4/1998 Helle et al. .................. 451/11
* cited by examiner Primary Examiner—Hadi Shakeri
(74) Attorney, Agent, or Firm—R W Becker & Associates; R W Becker

(57) ABSTRACT

A machine tool is provided, especially a multiple station grinding machine for the production of drill bits and similar elongate workpieces, which has at least one axially displaceable and rotatable workpiece holder which has its axial displacement and rotation drive in a sealed-off housing, at least one working tool arranged in a sealed-off working space, a sealing separation wall between the housing and the working space, at least one guide conduit arranged in sealing relationship in the separation wall for receipt of the workpiece holder, and guide elements for the workpiece disposed at the end of the guide conduit which extends into the working space.

11 Claims, 5 Drawing Sheets

MACHINE TOOL WITH A SEPARATION WALL BETWEEN A HOUSING AND A WORK SPACE

BACKGROUND OF THE INVENTION

The present invention relates to a machine tool, especially a multi-station grinding machine for manufacturing drill bits and similar, elongate workpieces, the machine tool having a separation wall between a housing and a work space.

DE 198 44 793 A1 discloses a machine tool having multiple axes—in particular, five axes—for the machining of workpieces including, preferably, cutting work on workpieces with a work tool spindle which is arranged on a platform with, in particular, its length axis vertical to the surface of the platform, whereby the platform is linked via, preferably, six linkages with the work tool spindle as well as with the length variable machine legs which are themselves connected to the machine supports. A movable separation element is available which, on one side, is connected on its outermost periphery with a housing (not illustrated) and, on its other side, is secured to the periphery of the platform or is linked therewith. Via the separation element and the platform, the movement space for the machine legs and the joints or links is completely separated or segregated from the work space. Only the work tool spindle and, if present, the support or, respectively, the slot for the arrangement of the work tool spindle, extends through the separation element, or respectively, the platform, into the working space. Numerous connections for the actuation of the work tool spindle are arranged behind the platform in a dirt and debris-free movement space. In connection with this machine tool, the working space encloses the workpiece to be worked as well as the working tool pieces and a work tool exchanger, and those of their guides and drives which are exposed to possible contact with material remnants generated during the machining process and, in connection with high performance machine tools having high pressure in the working region, possible contact with injected coolant lubricating medium.

DE 199 26 668 A1 discloses, additionally, a multiple station machine tool for the manufacture of drill bits and other workpieces having spiral grooves, the machine tool having a base plate, a plurality of stations arranged on the base plate for the machining of workpieces as well as for the receipt of workpieces, a holder secured to the base plate having a support plate, drives fixedly secured to the support plate for vertically movable, axially extendable and retractable, and rotatable workpiece holders, a rotating table arranged above the support plate which is rotatable in a stepwise manner, a plurality of vertically movable, axially extendable and retractable vertical shafts supported on the rotating table for supporting thereon the workpiece holders, releasable couplings between the drives and the driven elements for controlling the rotative movement, as well as the height adjustment, of the shafts, releasable interlocking elements between the couplings and the rotating table, and actuation elements for the couplings and the interlocking elements for component exchange related, coupled disengagement of the interlocking elements, for coupling of the couplings for the drives of the workpiece holders during the machining of workpieces as well as for component exchange related grouped de-coupling of the couplings, and for interlocking of the interlocking elements during further actuation of the rotating table.

With this arrangement, the stations of the multiple station machine tool can perform differing machining processes such as, for example, the grinding of spiral grooves, the grinding of points including the finishing of pointed ends, the creation of eccentrically relieved or back cut surfaces on the drill bit edges and the drill bit outer surfaces and, finally, the placement and removal of workpieces.

Due to this arrangement with the drives on the support plate, the drives do not need to be moved in correspondence with the movement of the support plate during station exchange movements so that the connection of the drives with a CNC control and the supply of energy to the drives is simplified.

In connection with a station change effected via the turning of the rotating table, in order to avoid variations in the workpiece holders—that is, in order to avoid turning or height variation in the workpiece holder during such change movements—releasable couplings and releasing interlocking elements are provided. Through the interlocking elements, the workpiece holders are fixed in their positions, if the couplings are in a de-coupled disposition. Conversely, if the couplings are coupled together in connection with the release of the interlocking elements, there occurs no position movement of the workpiece holders.

This multiple station machine tool solves the problem of improving the production of such workpieces by permitting their production in a cost favorable manner which requires only relatively little dimensioning and which operates reliably. Moreover, easy access to all stations is possible with such a machine so that the inactive or dead time for the exchange of work tools or the changing out of other required support elements for the workpiece machining can be limited to the shortest possible time. Furthermore, the position of the workpieces remains unchanged during the station change movement. This known machine has proven itself in connection with the mass production of spiral drill bits and similar workpieces but, however, has revealed that the drives for the workpiece holders, as well as the shafts and couplings associated therewith, are not sufficiently protected against the material remnants which are carried off in connection with the machining of the workpieces or the cooling lubricating medium which is used in such machining processes.

SUMMARY OF THE INVENTION

In general, the protection of sensitive components of machine tools from the material carried off in connection with the machining and from the typically deployed lubricating material is particularly lacking, if the cooling lubricating material is ejected in high performance machine tools under high pressure into the working region, whereby the invention provides a solution to this problem by offering a machine tool, especially, a multiple station grinding machine for the production of drill bits and similar elongate workpieces, which is improved such that a practically total protection of the sensitive components is provided.

From the perspective of this problem, a machine tool is provided, especially, a multiple station grinding machine for the production of drill bits and similar elongate workpieces, which has at least one axially displaceable and rotatable workpiece holder which has its axial displacement and rotation drive in a sealed-off housing, at least one working tool arranged in a sealed-off working space, a sealing separation wall between the housing and the working space, at least one guide conduit arranged in sealing relationship in the separation wall for receipt of the workpiece holder, and guide elements for the workpiece disposed at the end of the guide conduit which extends into the working space.

The present invention provides a practical embodiment of the concept of a machine tool which is divided into at least two spaces of which one is the working space such as, for example, the grinding chamber, while the other additional space is sealed off therefrom and has therein the most important mechanical elements for the machine tool including a workpiece exchange device.

The guide conduit is, advantageously, guided in a sealed manner through the separation wall by a precision guide during its axial displacements.

In order to move a workpiece from the housing, in which the workpiece has been disposed on a workpiece holder, into the working space, the workpiece holder with the workpiece disposed thereon is guided along the guide conduit into the working space. In this manner, the guide element encloses the workpiece in such a complete sealing manner that practically no cooling lubricating material or material carried off from the workpiece can find access into the housing in which the mechanical elements are housed. A seal element is disposed between the guide conduit and the separation wall which permits axial movement of the guide conduit with the workpiece holder thereon, in the event that this is needed for the machining of the workpiece.

The machine tool can be configured such that it includes at least one horizontally moveable workpiece holder; however, the workpiece holder can also be configured to move vertically.

The present invention permits equally a machine tool with only one working station as well as a machine tool with several working stations to be used and can be used in connection with milling machines as well as in connection with grinding machines.

The guide conduit can, for example, be held in its extended-out position via spring biasing, in which event the guide conduit is carried along by the axial movement of the workpiece holder.

Preferably, however, an axial displacement drive can engage the guide conduit, the axial displacement drive being controlled such that it axially displaces the guide conduit synchronously with the displacement of the workpiece holder by another axial displacement drive during the workpiece machining.

In a preferred embodiment of the machine tool, the axial displacement drive for the guide conduit can be disposed in a sealed-off manner in the working space, if a carry conduit extends through the separation wall and has, on its end which extends into the working space, a support for at least one working tool and is configured for the axial displacement drive of at least one guide conduit.

This carry conduit can include, on an end thereof which extends into the sealed-off housing, a support for a rotatable multiple station workpiece exchange device, whereby this end is fixedly connected with the support plate for at least one workpiece holder and its drive.

In a preferred embodiment of the machine tool, the machine tool includes five working stations and corresponding work tools in the working space, five workpiece holders and their drives in the housing, five guide conduits extending through the separation wall, and a six armed workpiece exchange device in the intermediate space between the separation wall and the support plate, whereby five arms are each respectively arranged in the region of the five workpiece holders for effecting thereat the transfer over or receipt of a workpiece, and one arm is moveable into the region of a workpiece transfer over device.

In this manner, the five workpieces can be simultaneously machined with different work tools while a further workpiece is transferred over to a workpiece holder by the workpiece exchange device or is received from the workpiece holder by the workpiece exchange device.

The guide element in at least one guide conduit can be configured to be exchangeable in order to permit the customization of the guide element for different workpieces. The guide element can, for example, comprise a guide bushing, if only the end region of a workpiece is to be machined. If an elongate workpiece is be machined over substantially its entire length, the guide element can advantageously be supported over substantially the entire length of the workpiece on a portion of the guide conduit extending thereunder and comprising a half-open guide rail. In this manner, the workpiece can be worked on one side thereof while the opposite side thereof is supported by the guide rail.

The workpiece holder seals the bushing in its extended-out position, even if no workpiece is currently disposed in the workpiece holder.

BRIEF DESCRIPTION OF THE DRAWINGS

The invention is described hereafter in further detail in connection with one embodiment of the present invention shown in the figures of the drawings.

DETAILED DESCRIPTION OF THE PREFERRED EMBODIMENT

Figure 5:
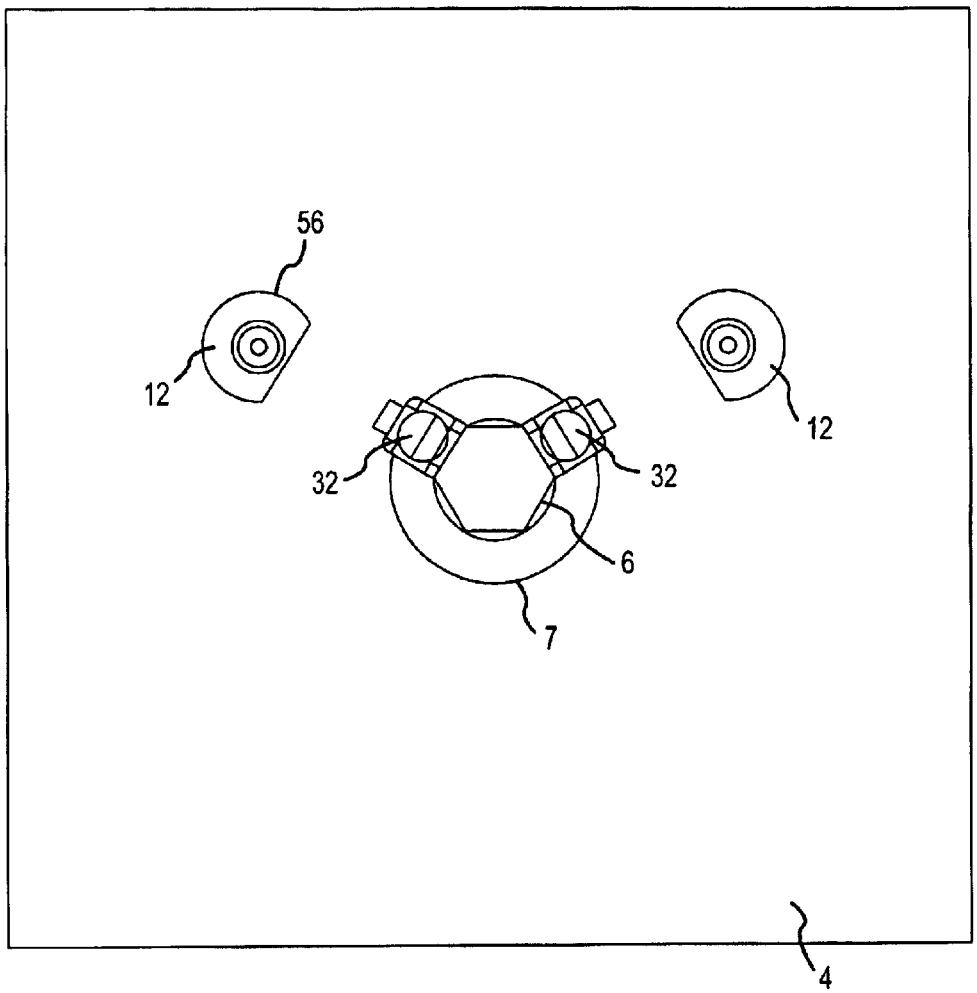
FIG. 5 is a schematic view of the separation wall as viewed in the direction of the arrow X in FIG. 3.

In the illustrated embodiment of the machine tool, the machine tool is configured as a grinding machine for the machining of spiral drill bits or other similar elongate workpieces and comprises five working stations and a workpiece transfer over and receipt station. Only two of the working stations, in any event, are illustrated in FIG. 5. In the illustrated machine tool, the workpieces are machined along a horizontal axis and are extended axially outwardly and retracted axially inwardly.

The machine tool can, however, also be configured with vertical axes, as is shown in DE 199 26 668 A1.

The machine tool includes a typical base plate 1 with a housing 2 which substantially seals off the important mechanical elements from the outside.

A further housing 3 encloses a work space 14 in which one or several workpieces 34 are subjected to a machining process.

A partition or separation wall 4 extends from the base plate 1 vertically and separates the working space 14 under the dome 3 from the machine space under the housing 2. A thick-walled support or carry conduit or tube 5 extends through the separation wall 4, the end of the carry conduit which extends into the working space 14 having a cover plate 6 secured thereto. A mounting conduit 7 extends from the cover plate 6 to the separation wall 4.

Figure 3:
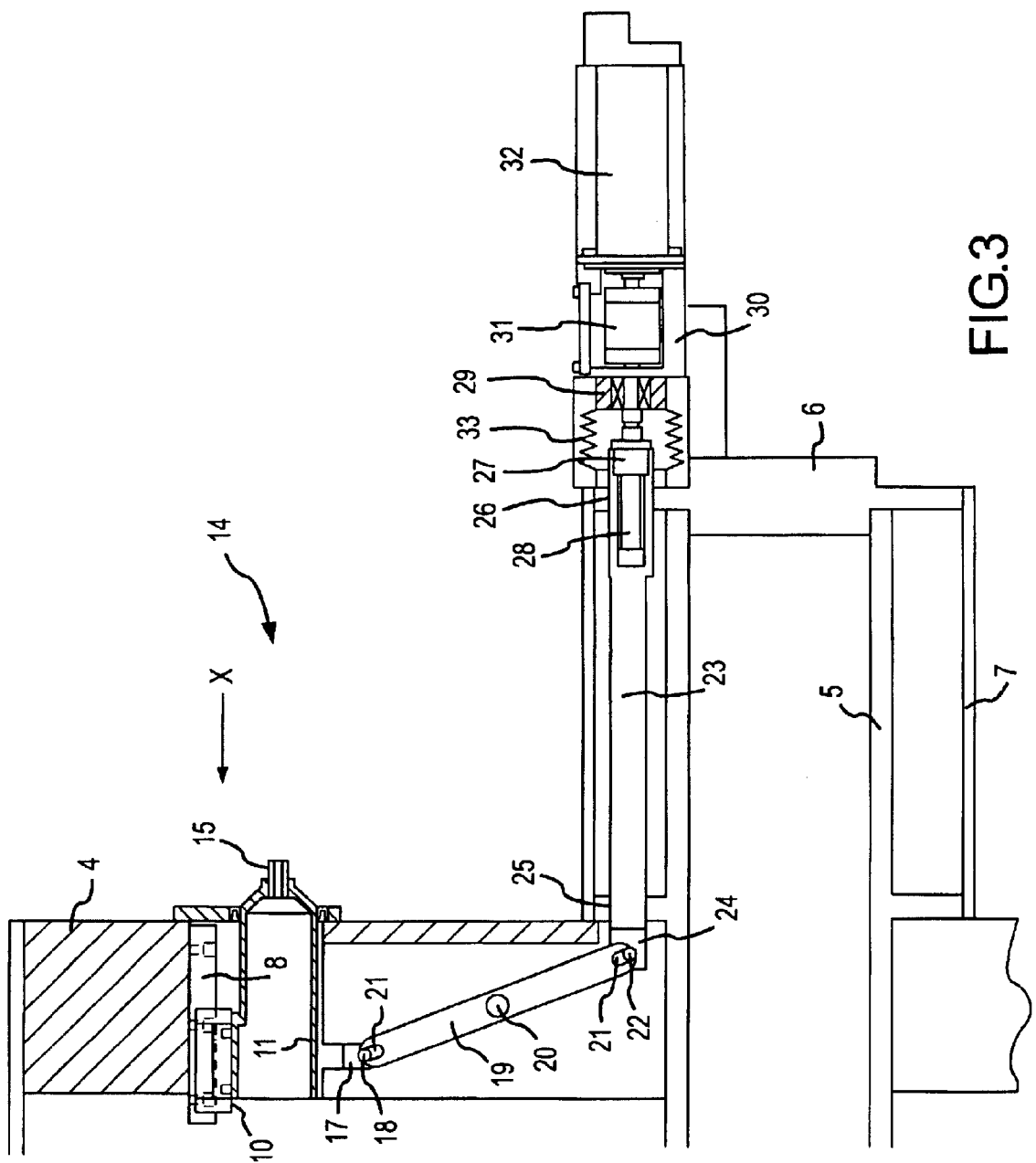
FIG. 3 is a partial sectional enlarged view of an example of the displacement drive for the guide conduit.

Various working tools including, especially, grinding spindles having differing grinding discs, are arranged on the mounting conduit 7. The cover plate 6 serves additionally as a support for at least a servo motor 32 (FIG. 3), whose function is explained in more detail later.

A linear guide 8 is secured via bolts 9 in an opening in the separation wall 4. A sliding shoe 10 slides along the linear guide 8, and a guide conduit 11 is secured to the sliding shoe 10. The opening in the separation wall 4 is closed off by means of a plate 12 and includes an opening therethrough which permits extension and retraction of the guide conduit 11 relatively therethrough. A sliding seal 13 is arranged between the plate 12 and the guide conduit 11.

Figure 1:
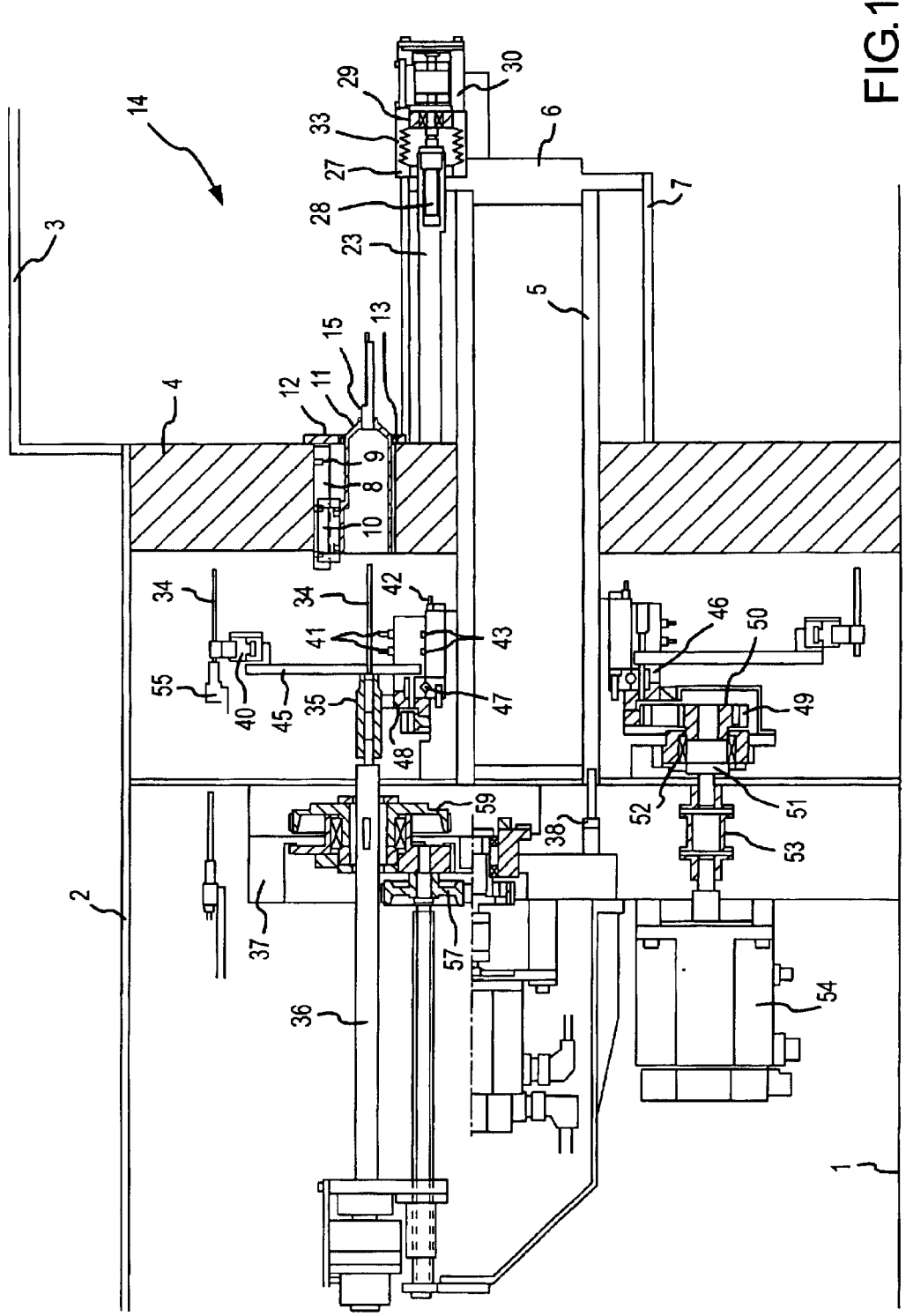
FIG. 1 is a schematic cross-sectional view of one embodiment of the inventive machine tool.

A guide bushing 15 is exchangeably disposed on the end of the guide conduit 11 which extends into the working space 14, in connection with the embodiment illustrated in FIG. 1. This guide bushing 15 guides a workpiece 34 and seals off the workpiece relative to the interior of the housing 2. The shape and dimensions of the guide bushing 15 are selected in correspondence with the respective workpiece which is to be machined and, in connection with the embodiment shown in FIG. 1, serves to guide a workpiece whose end region is to be machined.

Figure 2:
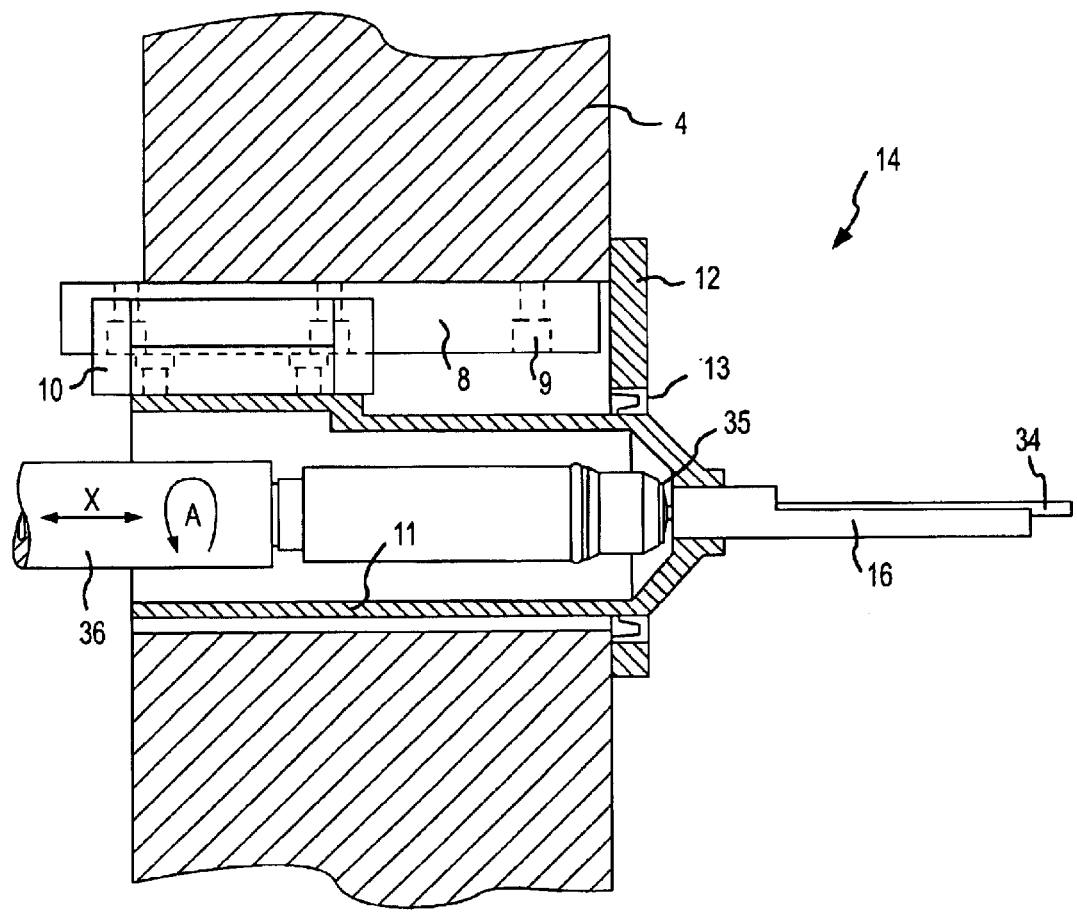
FIG. 2 is an enlarged sectional view of the region of the separation wall with the guide conduit.

In the embodiment shown in FIG. 2, a guide element in the form of a guide rail 16 is shown which supports the workpiece substantially along the entirety of the portion thereof which extends along the guide conduit 11 and the guide rail is open generally along a half-side thereof so that the workpiece 34 can be machined in this open region.

In order to axially extend and retract the guide conduit 11, a displacement drive is provided. In this connection, the guide conduit 11 includes a slot 17 which is disposed approximately at a location diametrically opposite the sliding shoe 10. A pin 18 extends transversely through the slot 17 and this pin 18 extends through a slot 21 in a swing lever 19 which is pivotally mounted on a pivot axle or shaft 20 in the separation wall 4. An additional slot 21 is disposed at the other end of the swing lever 19 and receives therethrough a pin 22 which extends into a slot 24 of a driving rod 23. The driving rod 23 is guided in guide bores 25, 26 and includes, at its end opposite to the end thereof which receives the pin 22, a circumferential capped nut 27. A circumferential capped or antifriction ball spindle 28 is engaged by the circumferential capped nut 27, the circumferential capped spindle 28 being supported in a radial-axial bearing 29. The circumferential capped spindle 28 is coupled via a coupling 31, which is disposed in the housing 30, with the servo motor 32.

A bellows 33 is disposed between the axial radial bearing 29 and the guide bore 26, the bellows 33 protecting the circumferential capped nut 27 and the circumferential capped spindle 28 against the penetration thereto of grinding debris and cooling lubricating material.

Mechanical elements of the machine tool are disposed under the dome or hood 2. A support plate 37 which extends parallel to the separation wall 4 and perpendicular to the base plate 1 supports thereon axially displaceable shafts 36, each of which supports a workpiece holder in the form of a chuck 35 such that the chuck is rotatable and axially displaceable. Reference is had to DE 199 26 668 A1 with respect to the details of an axial displacement drive 57 and a rotation drive 59 for the shafts 36, as well as the details of the gripping and releasing mechanisms of the workpieces 34 in the chucks 35, the machine tool of the illustrated embodiment of the present invention being distinguished from the referenced machine tool in that the chucks 35 on the shafts 36 are not fixedly connected to a rotation table and, correspondingly, the associated couplings and interlocking elements are also not present.

The support plate 37 is secured via bolts 38 to the support conduit 5 to thereby increase the stiffness of the support plate.

Figure 4:
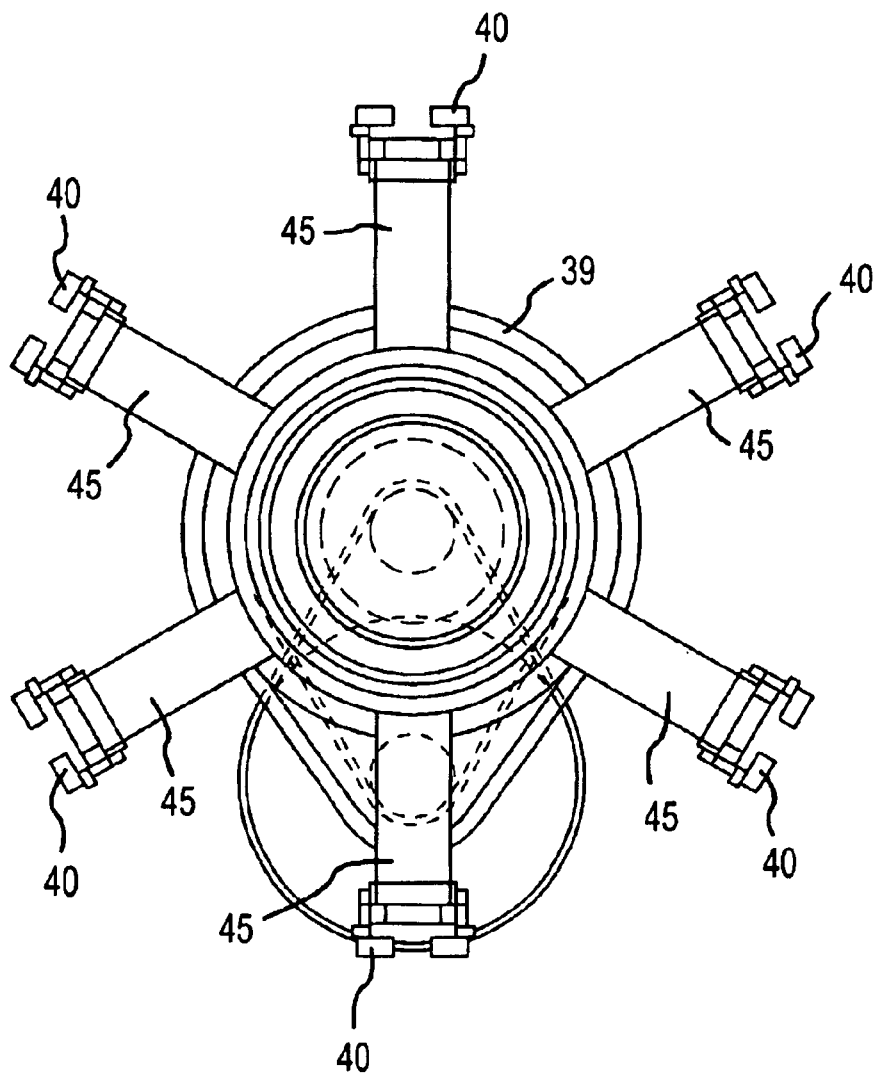
FIG. 4 is an axial view of a rotatable workpiece exchange element having six arms.

A rotatable workpiece exchange mechanism 39 (see FIG. 4) is located between the separation wall 4 and the support plate 37. Workpiece grippers 40 are secured on the free ends of the six arms 45 which can be actuated, in a not illustrated manner, via hydraulic or pneumatic cylinder piston units. The actuation means for these hydraulic or pneumatic cylinder and piston units is connected thereto via rotation connections extending from fittings 42 to annular slots 43 and fittings 41 arranged in a driving collar 46. The six arms 45 are secured to the driving collar 46 and the driving collar is supported on the support conduit 5 in a radial axial bearing 47.

A gear 48 is secured to the driving collar 46 and a chain 49 is trained therearound as well as around a gear 50. The gear 50 is secured to a shaft 51 which is rotatably supported via a rolling bearing 52 on the support plate 37.

The shaft 51 is connected via a coupling 53 with a servo motor 54, which serves to rotate and position the workpiece exchange mechanism 39.

A workpiece transfer over mechanism 55 removes a not yet worked workpiece 34 out of a not illustrated workpiece holder and disposes it in the region of a gripper 40 of an arm 45 which is positioned with respect to the workpiece transfer over mechanism 55. The other grippers 40 are disposed in positions in which a workpiece can be taken over by a chuck 35 from the gripper 40.

The chucks 35 are thus disposed in the positions as shown on the shafts 36 as illustrated in FIG. 1.

Following the takeover of the workpieces 34, the shafts 36 with the chucks 35 and the workpieces 34 taken over by the chucks are moved axially into the position shown in FIG. 2 in which the workpiece extends into the working space 14 and is supported thereat on one side by the guide rail 16. For the machining of a spiral groove in the workpiece 34, the workpiece is axially displaced outwardly and retracted axially inwardly relative to the X axis and is rotated about the axis A. In this manner, the guide conduit 11 is moved synchronously via the drives 19, 23, 27, 28, 32 with the shaft 36, the chuck 35, and the workpiece 34, so that the workpiece 34 or, respectively, the guide rail 16, rotates but, however, is not axially displaced.

As seen in FIG. 5, two grinding stations 56 are illustrated at an offset of 120° to one another. There can, however, be up to five working stations arranged around the mounting conduit 7.

The specification incorporates by reference the disclosure of German priority document 101 00 709.4 of Jan. 10, 2001.

The present invention is, of course, in no way restricted to the specific disclosure of the specification and drawings, but also encompasses any modifications within the scope of the appended claims.

What I claim is:

1. A machine tool particularly configurable as a multiple station grinding machine for the production of drill bits and other similar elongate workpieces, comprising:

at least one axially displaceable and rotatable workpiece holder having its associated axial displacement drive and rotation drive disposed in a housing sealed off against penetration of material from an external region;

at least one tool for machining a workpiece disposed in a working space sealed off against penetration of material from an external region;

a sealing off separation wall between the housing and the working space;

at least one guide conduit extending through the separation wall in a sealed manner relative thereto such that material cannot pass from one side of the separation wall to the opposite side thereof, the guide conduit being provided for receiving the at least one workpiece holder; and guide elements for guiding a workpiece to be machined on a portion of the at least one guide conduit extending into the working space.

2. A machine tool according to claim 1, wherein the at least one guide conduit is axially displaceable in a sealed manner through the separation wall by a precision guide.

3. A machine tool according to claim 2, wherein the at least one guide conduit is coupled to an axial displacement drive for effecting axial displacement of the at least one guide conduit.

4. A machine tool according to claim 3, wherein the axial displacement drives for the at least one workpiece holder and the at least one guide conduit are synchronously movable with one another during machining of a workpiece.

5. A machine tool according to claim 3, wherein the axial displacement drive for the at least one guide conduit is disposed in the working space in a sealed off manner.

6. A machine tool according to claim 3, wherein a carry conduit extends through the separation wall, and a portion thereof extending into the working space is configured as a support for said at least one tool for machining a workpiece and for the axial displacement drive for said at least one guide conduit.

7. A machine tool according to claim 6, wherein the portion of the carry conduit extending through the separation wall into the housing serves as a support for a rotatable multiple station workpiece exchange mechanism, and an end of the portion of the carry conduit extending into the housing is connected with a support plate for said at least one workpiece holder and said associated drives.

8. A machine tool according to claim 7, wherein the machine tool includes five working stations and corresponding tools in the working space, five workpiece holders and their drives in the housing, five guide conduits extending through the separation wall, and a six armed workpiece exchange mechanism in an intermediate space between the separation wall and the support plate, whereby five arms are each respectively arranged in a region of the five workpiece holders for effecting thereat the transfer over or receipt of a workpiece, and one arm is moveable into the a region of a workpiece transfer over mechanism.

9. A machine tool according to claim 1, wherein the guide elements are exchangeably disposed in the at least one guide conduit.

10. A machine tool according to claim 1, wherein the guide elements comprise guide bushings.

11. A machine tool according to claim 1, wherein the guide elements comprise a guide rail which supports a workpiece substantially along the entirety of a portion thereof which extends along a portion of the at least one guide conduit extending into the working space, and the guide rail is open generally along a half-side thereof.

* * * * *